United States Patent [19]

Hopkins et al.

[11] Patent Number: 4,926,919

[45] Date of Patent: May 22, 1990

[54] VEHICLE TIRE WITH RIB TYPE TREAD PATTERN HAVING SIPES ACROSS THE RIBS

[75] Inventors: William M. Hopkins, Hudson; Robert A. Brightwell, Uniontown; Ray A. Young, East Sparta; John K. Clark, Copley; Frederick W. Miller; Richard L. Galante, both of Akron; Terry J. Waibel, Wadsworth; Michael A. Kolowski, Mogadore, all of Ohio

[73] Assignee: The Goodyear Tire & Rubber Company, Akron, Ohio

[21] Appl. No.: 270,598

[22] Filed: Nov. 14, 1988

[51] Int. Cl.$^5$ .................................. B60C 11/12
[52] U.S. Cl. .................. 152/209 R; 152/DIG. 3
[58] Field of Search .......... 152/209 R, 209 D, 209 A, 152/DIG. 3

[56] References Cited

U.S. PATENT DOCUMENTS

| D. 100,591 | 7/1936 | Yelm | D12/142 |
|---|---|---|---|
| D. 145,155 | 7/1946 | Christie | D12/142 |
| D. 177,655 | 5/1956 | Wolfer | D12/143 |
| D. 207,619 | 5/1967 | Hunter | D12/141 |
| D. 225,136 | 11/1972 | Sayers et al. | D12/141 |
| D. 230,532 | 2/1974 | Stella et al. | D12/141 |
| D. 261,492 | 10/1981 | Remy | D12/143 |
| D. 261,496 | 10/1981 | Remy | D12/147 |
| D. 276,906 | 12/1984 | Kojma et al. | D12/147 |
| D. 280,981 | 10/1985 | Ohta et al. | D12/142 |
| D, 290,243 | 6/1987 | Ghilardi | D12/142 |
| 1,400,263 | 12/1921 | Carlisle | 152/209 R |
| 1,452,099 | 4/1923 | Sipe | 152/323 |
| 2,094,636 | 10/1937 | Bull | 152/209 R |
| 2,121,955 | 6/1938 | Eger | 152/209 R |
| 2,186,180 | 1/1940 | Sloman et al. | 152/209 R |
| 2,197,662 | 4/1940 | Hughes | 152/209 R |
| 2,302,027 | 11/1942 | Havens | 152/209 R |
| 2,716,435 | 8/1955 | Herzegh | 152/209 R |
| 2,821,231 | 1/1958 | Kraft | 152/209 R |
| 2,926,715 | 3/1960 | Constantakis | 152/209 R |
| 3,698,462 | 10/1972 | Jacobs | 152/209 R |
| 4,298,046 | 11/1981 | Herbellean et al. | 152/209 R |
| 4,353,402 | 10/1982 | Burche | 152/209 R |
| 4,484,610 | 11/1984 | Wallet et al. | 152/209 R |
| 4,515,197 | 5/1985 | Motomura et al. | 152/209 R |
| 4,649,975 | 3/1987 | Kogure et al. | 152/209 R |
| 4,705,088 | 11/1987 | Ghilardi | 152/209 R |
| 4,823,855 | 4/1984 | Goergen | 152/209 R |

FOREIGN PATENT DOCUMENTS

| 1395200 | 7/1985 | Benelux . | |
|---|---|---|---|
| 1397100 | 8/1985 | Benelux . | |
| 990482 | 10/1979 | United Kingdom . | |
| 1017319 | 5/1984 | United Kingdom . | |
| 1023586 | 5/1985 | United Kingdom . | |
| 1026891 | 11/1985 | United Kingdom . | |
| 2160829 | 1/1986 | United Kingdom | 152/DIG. 3 |
| 1035191 | 12/1986 | United Kingdom . | |
| 1036017 | 1/1987 | United Kingdom . | |
| 1037407 | 3/1987 | United Kingdom . | |

OTHER PUBLICATIONS

1967 Tread Design Guide, p. 13, Brunswick Sport King, lower right hand corner of page.
1986 Tread Design Guide, p. 115, Dean Super Stinger, middle of top row of pictures.

Primary Examiner—Michael W. Ball
Assistant Examiner—Geoffrey L. Knable
Attorney, Agent, or Firm—L. R. Drayer

[57] ABSTRACT

A vehicle tire (10) has a tread (20) with a plurality of ribs (30,31,32) extending circumferentially about the tread. The ribs each have a pair of lateral edges (48,49;60,61) which comprise edge segments placed end to end to present a zigzag configuration. Each rib has grooves (37,38;39,40) therein which intersect the lateral edges of the respective rib and have varying depths at said lateral edges. Preferably, the tread has an all-season configuration.

17 Claims, 5 Drawing Sheets

VEHICLE TIRE WITH RIB TYPE TREAD PATTERN HAVING SIPES ACROSS THE RIBS

The present invention relates generally to pneumatic tires and more specifically to tires for pick-up trucks, vans and similar vehicles.

Tires utilized on pick-up trucks, vans and similar vehicles have historically exhibited irregular wear patterns. This problem is at least partially attributable to the fact that suspension systems on such vehicles must have the capability to handle extreme variations in load conditions while yielding acceptable ride and handling at all times. That is to say, on some occasions, the operator of a pick-up truck or van may commute in an urban environment with only one or two persons as the total vehicle payload, while on other occasions the same vehicle operator may rely upon the same vehicle to carry considerably heavier payloads of camping equipment, construction materials, and so forth. Furthermore, in many localities, the vehicle tires must also operate satisfactorily under widely varying climactic conditions. It is therefore a challenge to a tire engineer to provide a product that gives uniform treadwear and good treadlife, traction and handling in this varying operating environment.

A tire according to the present invention overcomes the foregoing obstacles by providing: a rib type of tread pattern in the central portion of the tread with sipes in the ribs in a particular manner to obtain more uniform tread wear during the useful life of the tire: an all-season type of tread pattern in the shoulder portions of the tire: laterally extending traction edges on the circumferential ribs to improve the traction characteristics of the tire, and see-through circumferential grooves to improve the operating characteristics of the tire on wet pavement.

The features of the present invention which are believed to be novel are set forth with particularity in the appended claims. The present invention, both as to its structure and manner of operation, may best be understood by reference to the following detailed description, taken in accordance with the accompanying drawings in which:

As used herein and in the claims "radial" and "radially" refer to directions which are perpendicular to the axis of rotation of a tire, and "axial" and "axially" refer to directions parallel to the axis of rotation of a tire. A tire has a mid-circumferential plane CP which is disposed perpendicular to the axis of rotation of the tire, and is equidistant from the axial edges $TE_1$, $TE_2$ of the tread in a "footprint of a tire". As used herein a "footprint of a tire" refers to a static footprint of a tire that has been mounted on its specified rim, inflated to its specified inflation pressure and subjected to its rated load for said inflation pressure. The specified rim, inflation pressure, and load for a tire may be determined from the manufacturer of the tire, or from an organization which publishes industry standards (e.g., The Tire & Rim Association or The European Tyre & Rim Technical Organization). The tread width TW is the greatest axial distance between the lateral edges $TE_1$, $TE_2$ of the tread in a footprint of the tire.

Referring to FIGS. 1 to 4, there is illustrated, by means of a working example, a tire of size LT215/85R16 according to a preferred embodiment, and all actual dimensions related herein are for a tire of said size. A pneumatic tire 10 according to the invention has what is commonly referred to in the tire art as a radial ply carcass structure. For the purposes of the present invention, a tire has a radial ply carcass structure when the cords of the carcass reinforcing ply, or plies 11,12, are oriented at angles in the range of 75° to 90° with respect to the mid-circumferential plane CP of the tire.

Figure 1:
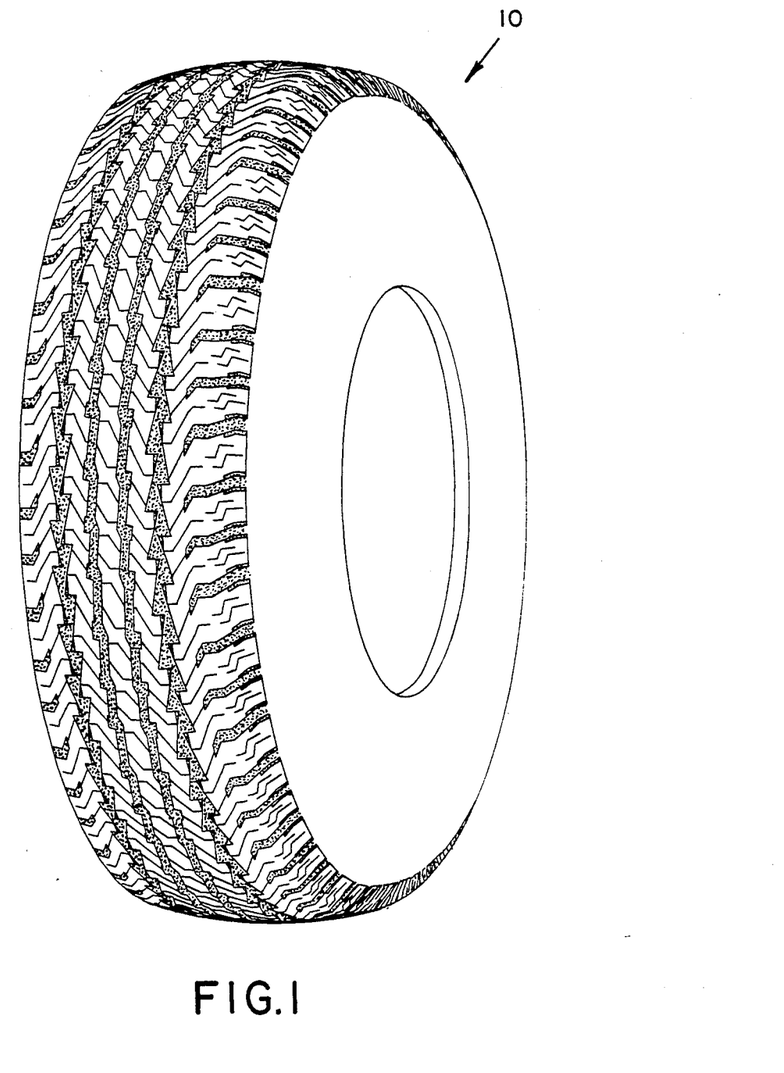
FIG. 1 is a perspective view of a tire in accordance with the invention.
Figure 2:
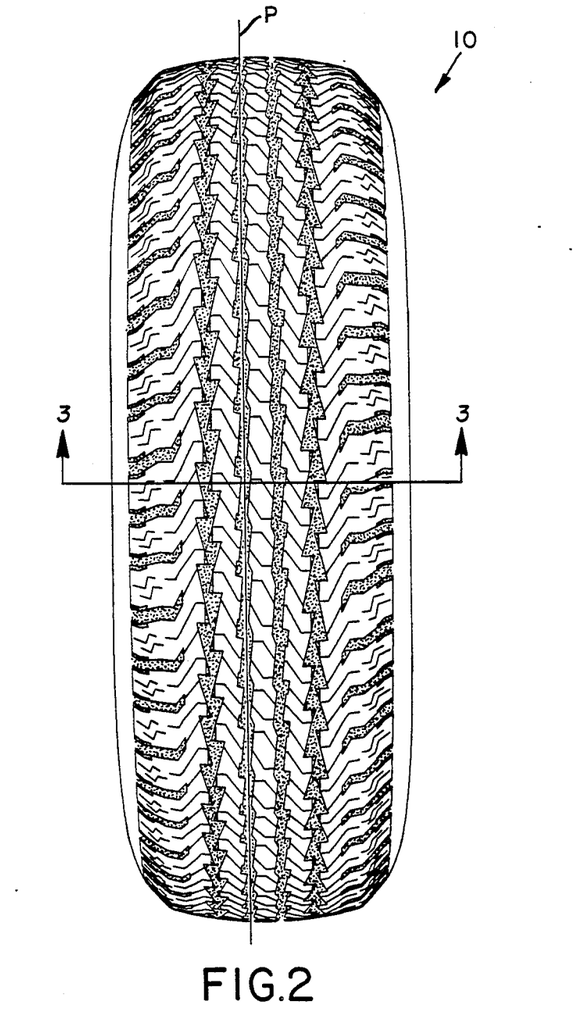
FIG. 2 is a front elevation view of the tire shown in FIG. 1.
Figure 3:
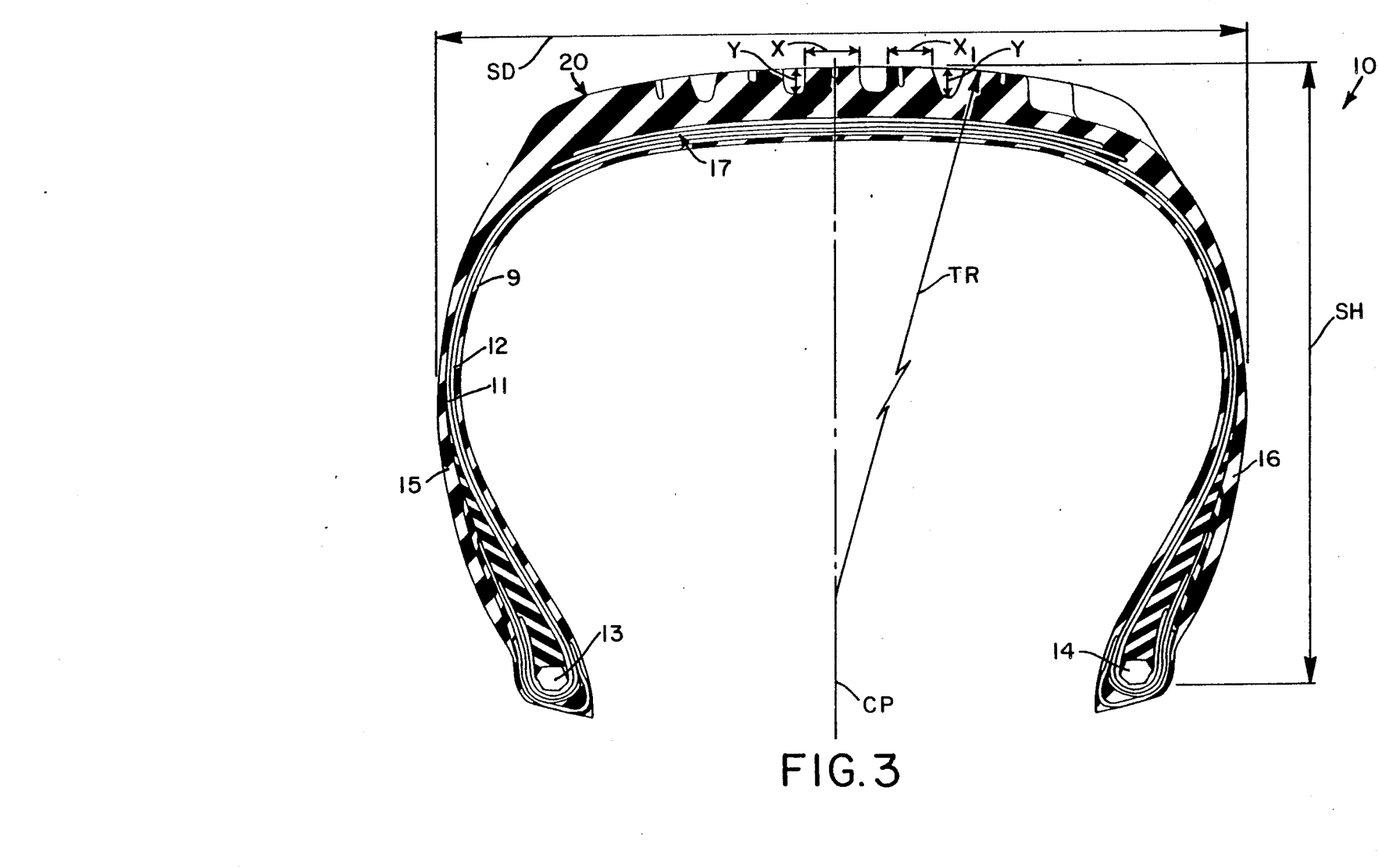
FIG. 3 is a cross-sectional view of the tire shown in FIGS. 1 and 2 taken in a plane that contains the axis of rotation of the tire substantially along line 3—3 of FIG. 2.

A tire 10 according to the invention has a pair of substantially inextensible annular beads 13,14 which are axially spaced apart from one another. Each of the beads is located in a bead portion of the tire which has exterior surfaces configured to be complimentary to the bead seats and retaining flanges of a rim (not shown) upon which the tire is designed to be mounted. A radial ply carcass structure, in the preferred embodiment comprising two plies 11,12 of side-by-side reinforcing cords of polyester material, extends between the beads with an axially outer portion of the carcass structure folded about each of the beads. While in the preferred embodiment, the carcass ply structure comprises two plies of reinforcing material, it is understood that one or more carcass plies of any suitable material may be employed without deviating from the scope of the present invention.

Preferably, a tire according to the invention is a tubeless tire having a layer of a low permeability material 9 disposed inwardly of the carcass plies 11,12 and contiguous to an inflation chamber defined by the tire and rim assembly. Elastomeric sidewalls 15,16 are disposed axially outwardly of the carcass ply structure. A circumferentially extending belt structure 17 comprising two belts, each of which preferably comprises steel reinforcing cables characterized by said cables having a breaking strength of at least 800 Newtons. The cables used in the working example have a structure of four filaments of 0.30 mm diameter wire and have a cable break strength of 890 Newtons ±65 Newtons. It is believed, however, that any suitable combination of folded and/or unfolded belt plies, reinforced by cables of any suitable metallic or nonmetallic material selected in accordance with good engineering practices may be employed in practicing the broader aspects of the invention.

A tread 20 comprising one or more elastomeric compounds is disposed radially outwardly of the belt structure 17 and extends circumferentially about the axis of rotation of the tire 10 and the belt structure 17. The physical properties of the tread compound are preferably such that the tread has a high resistance to tearing. In a preferred embodiment, at least a radially outer layer of the tread 20 comprises an elastomeric compound having an elongation at break of at least 575%, and a 300% modulus in the range of 6.3 to 8.3 as determined by ASTM standard D412. In a tire according to the working example, the tread compound had a specified 300% modulus of 7.3 and a specified elongation of 630%.

It is believed that the good performance characteristics of a tire according to the invention are attributable at least in part to the cross-sectional shape of the tire. All of the tire dimensions used herein and in the claims are understood to refer to a tire having a tread that has not yet been used on a vehicle but which has been mounted on its specified rim and inflated to its specified inflation pressure while not being subjected to any load. That is to say, the invention applies to both new tires and retreaded tires. Definitions of the terms used herein and in the claims for describing the cross-sectional shape of a tire according to the invention are set forth below with reference to FIG. 3.

"Section height" (SH) refers to the radially measured distance from the nominal bead diameter of the tire to the maximum diameter of the tire.

"Maximum section width" (SD) refers to the greatest axial distance between the axially outer surfaces of the tire sidewalls exclusive of indicia or ornamentation on the sidewalls.

"Aspect Ratio" refers to the ratio of section height SH to maximum section width SD, or put another way SH/SD. A tire in accordance with the present invention preferably has an aspect ratio in the range of about 65 to about 85. For example, a tire of size LT215/85R16 has a section height SH of about 7.2 inches, and a maximum section width SD of about 8.5 inches and an aspect ratio of about 0.85.

"Tread Radius" (TR) refers to the radius of curvature, having its center on the mid-circumferential plane M of the tire, which is followed by the radially outer surfaces of the traction elements of the tread.

A tire in accordance with the present invention has a ratio of tread radius to maximum section width TR/SD in the range of 1.2 to 1.9, preferably in the range of 1.3 to 1.7. For example, a tire of size LT215/85R16 has a tread radius TR of about 14 inches, a maximum section width SD of about 8.5 inches and the ratio TR/SD is about 1.6.

The tread 10 of a tire according to the invention has a set of at least three ribs 30,31,32 extending circumferentially about the tread with each of said ribs bordered by two grooves 33,34,35,36 which each extend circumferentially about the tread. It is preferred that each of the circumferentially extending grooves 33,34,35,36 have a configuration such that a plane which is perpendicular to the tire's axis of rotation may extend through the groove without intersecting a lateral edge of a rib. In the working example, portions of the groove walls are beveled as illustrated at 65 in FIG. 4 to facilitate this feature of the preferred embodiment. The central, or centermost, rib 31 of said set is disposed midway between the tread edges $TE_1$, $TE_2$ and has a series of grooves 37,38 therein which are disposed obliquely with respect to a plane containing the axis of rotation of the tire. Each of the obliquely extending grooves 37,38 in said series extends completely across the central rib 31 in the example illustrated in the drawing, but it is understood that it is not essential to the practice of the invention that the obliquely extending grooves extend completely across the central rib. The depth of each of the obliquely extending grooves 37,38 of said series in said central rib 31 varies along its length such that its minimum depth is not more than 50%, preferably not more than 40%, of its maximum depth. In a tire according to the working example, the minimum depth of said obliquely extending grooves 37,38 was about 2.5 mm (0.1 inch) and maximum depth was about 7.1 mm (0.28 inch), such that the minimum depth was only 35% of the maximum depth.

Figure 4:
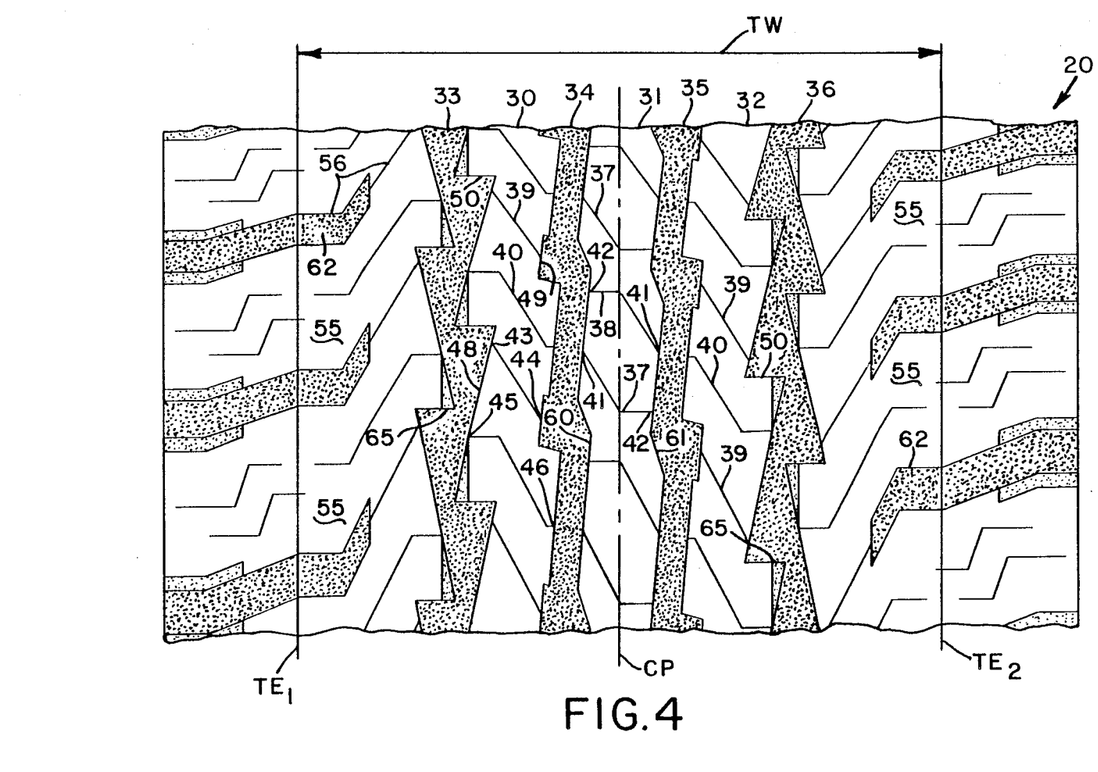
FIG. 4 is an enlarged fragmentary plan view of the tread portion of the tire shown in FIGS. 1, 2 and 3.

At least one other circumferentially extending rib 30,32 of said set of ribs is disposed on each side of the central rib 31. These other ribs 30,32 each also have a series of grooves 39,40 therein which extend completely across the ribs and are disposed obliquely with respect to a plane containing the axis of rotation of the tire. The variation in depth, if any, along the length of any one of the obliquely extending grooves 39,40 differs from the variation in depth along the length of the circumferentially next adjacent obliquely extending grooves 39,40 in the same rib 30,32. Preferably, the maximum depth of each of the obliquely extending grooves 39,40 in the other ribs differs from the maximum depth of circumferentially next adjacent obliquely extending grooves 39,40 in the same rib by more than 50%, preferably by more than 60%. Most preferably, the obliquely extending grooves in said other ribs 30,32 alternate circumferentially between grooves 39 which follow straight paths and have a substantially constant depth along their lengths, and grooves 40 which follow zigzag paths and vary in depth along their lengths such that their minimum depths are not more than 50%, most preferably not more than 40%, of their maximum depths. In a tire according to the working example, the straight grooves 39 have a depth of about 2.5 mm (0.1 inch) along their entire length and the zigzag grooves 40 have a minimum depth of about 2.5 mm (0.1 inch) and a maximum depth of about 7.1 mm (0.28 inch).

The circumferentially extending grooves 33,34,35,36 bordering the circumferentially extending ribs 30,31,32 have greater depths than the obliquely extending grooves 37,38,39,40 in the adjacent ribs. In the working example, the circumferentially extending grooves have depths of about 10.7 mm (0.42 inch) as compared to maximum depths of 7.1 mm (0.28 inch) in the obliquely extending grooves. The obliquely extending grooves 37,38,39,40 in each of the circumferentially extending ribs 30,31,32 have widths which are less than the widths of the circumferentially extending grooves 33,34,35,36 bordering the same rib, as measured perpendicular to a groove's centerline at a radially outer surface of the tread. It is preferred that each of the grooves extending circumferentially about the tire have widths such that they will remain open in a footprint of the tire, while the obliquely extending grooves in the ribs have widths such that they will close up in a footprint of the tire. In the working example, the circumferentially extending grooves 33,34,35,36 have widths of about 6.4 to 7.6 mm (0.25 to 0.3 inches), while the obliquely extending grooves 37,38,39,40 in the circumferentially extending ribs 30,31,32 have widths of only about 0.8 mm (0.03 inch), as measured perpendicular to a groove's centerline at a radially outer surface of the tread.

In a tire according to the preferred embodiment the central rib 31 has a configuration such that the ratio of the maximum width X of the central rib (as shown in FIG. 3) as measured parallel to the axis of rotation of the tire, to the maximum depth Y of the circumferentially extending grooves 34, 35 bordering the central rib, as measured perpendicular to the axis of rotation of the tire, is in the range of 1.3 to 1.8. Furthermore, for each of said other ribs 30,32 the ratio of the maximum width of the rib $X_1$, as measured parallel to the axis of rotation of the tire, to the maximum depth Y of the circumferentially extending grooves 33,34;35,36 bordering each said other rib is greater than for the central rib. In the working example, the central rib has a maximum width X of about 16.5 mm (0.65 inch) and the other ribs have maximum widths $X_1$ of about 20 mm (0.8 inch), while all of the circumferentially extending grooves have depths Y of about 10.8 mm (0.42 inch). The applicable ratio X/Y for the central rib is about 1.5 and for the other ribs is about 1.8 in the working example.

Preferably, each of the obliquely extending grooves 37,38 in the central rib 31 varies in depth along its length with the depth of each of said grooves being greater at one end 41 of the groove than at the other end 42 of the groove. Most preferably, the deeper end 41 of each said obliquely extending groove 37,38 in the central rib 31 is at the opposite lateral edge 60,61 of the central rib from the deeper ends of the circumferentially next adjacent grooves obliquely extending grooves in the central rib. That is to say, the central rib 31 has a pair of lateral edges 60,61 and each obliquely extending groove 37,38 in the central rib is at its maximum depth at the junction 41 of the oblique groove and only one lateral edge of the tread, with said maximum depth junction 41 being at an opposite lateral edge of the central rib from the maximum depth junctions 41 of the circumferentially next adjacent obliquely extending grooves in said central rib.

The obliquely extending grooves 39,40 which completely traverse the other circumferentially extending ribs 30,32 each have depths at their junctions 43,44,45,46 with the lateral edges 48,49 of the same rib which differ from the depths of the circumferentially next adjacent grooves extending obliquely across the same rib at their junctions with the lateral edges of the rib. In the working example, the straight obliquely extending grooves 39 each have a depth of about 7.1 mm along its entire length so its junctions 43,44 with the lateral edges of the rib have depths of 7.1 mm. However, the zigzag obliquely extending grooves 40 have depths of only about 2.5 mm at their junctions 45,46 with the lateral edges of the rib.

The other circumferentially extending ribs 30,32 on either side of the central rib 31 have lateral edges 48,49 comprising edge segments disposed end to end to present a zigzag configuration with some of said edge segments 50 being oriented substantially parallel to the axis of rotation of the tire. Furthermore, the other ribs may be beveled at the segments 50 as illustrated at 65 in FIG. 4. That is to say, some of said segments 50 are oriented at angles in the range of 0° to 10° with respect to the axis of rotation of the tire. This feature of the invention is theorized to contribute to the tractive characteristics of the tire. Most preferably, the lateral edges 60,61 of the central rib 31 also comprise edge segments placed end to end to present a zigzag configuration.

It is believed that the varying depths of the obliquely extending grooves in the central rib and the other ribs at the lateral edges of the ribs in combination with the zigzag configuration of the rib edges is a means for varying the flexibility and rate of abrasive wear of the ribs along the circumferential length of the ribs.

A circumferentially extending array of shoulder blocks 55 is disposed between each lateral edge $TE_1$, $TE_2$ of the tread and the nearest of said circumferentially extending grooves 33,36. The circumferentially next adjacent blocks 55 in said arrays are separated from one another by separating grooves 56 extending from a tread edge $TE_1$, $TE_2$, to the nearest circumferentially extending groove 33, 36 with at least the axially outermost one-half inch 62 of each separating groove which adjoins a tread edge $TE_1$, $TE_2$ configured such that the tire meets established industry criteria be an "all season" tire and a portion of each separating groove 56 is disposed obliquely with respect to a plane containing the axis of rotation of the tire in a sense which is opposite to the sense at which the grooves 39, 40 extend across the rib 30, 32 nearest to the respective tread edge.

As used herein and in the claims, an all-season tire is understood to be a tire which meets the mud and snow (M&S) relating criteria established by the Rubber Manufacturers Association (RMA), Akron, Ohio, U.S.A. In general, such a rating requires that the tire tread have grooves communicating with the lateral edges of the tread: (a) having depths at the tread edges that are substantially equal to the average groove depth in the vicinity of the mid-circumferential plane of the tire; (b) oriented in a substantially axial direction for at least the axially outermost one-half inch (13 mm) of its length, and (c) having a width of at least 0.060 inch (1.5 mm) at the radially outermost surface of the tread when the tread is new.

The tread has an overall net-to-gross ratio in the range of 65% to 70%. Most preferably, the net-to-gross ratio in a zone of the tread disposed between the centerlines of the axially outermost circumferentially extending grooves 33,36 is less than the net-to-gross in the zones disposed between said groove centerlines and the closest tread edge $TE_1$, $TE_2$. For the purpose of describing and claiming this invention, the net-to-gross ratio is the ratio between the surface area of the tread which comes into contact with the ground in a static footprint of a tire versus the total area of the static footprint of the tire.

Figure 5:
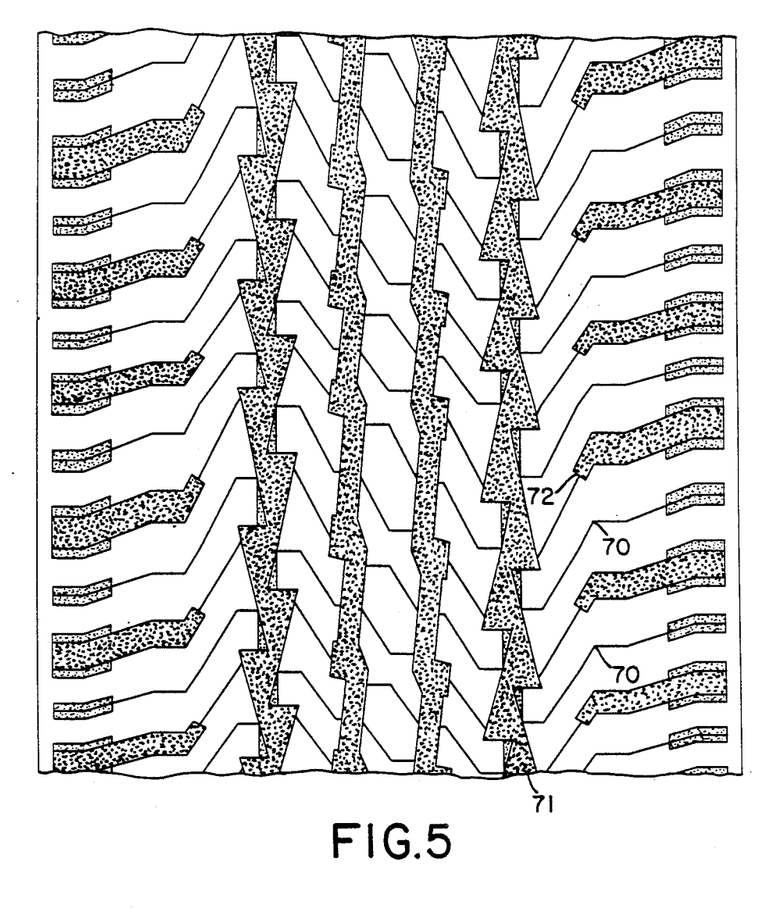
FIG. 5 is a fragmentary plan view of a tire tread according to an alternate embodiment.

In an alternate embodiment, as illustrated in FIG. 5, a narrow groove 70 follows a zigzag path from a circumferentially extending groove 71 to the shoulder portion of the tire in order to provide an aesthetically pleasing appearance as the tread wears away during use. Furthermore, the wide portions 72 of the separating grooves may be squared off to fine tune the rigidity of the shoulder elements.

It will be apparent to those skilled in the tire art that other features of the tire could be modified while remaining within the scope of the present invention.

We claim:

1. A tire comprising a tread having a pair of lateral edges and a set of at least three ribs extending circumferentially thereabout with each said rib having a pair of lateral edges bordered by two grooves which each extend circumferentially about the tread, the central rib of said set being disposed midway between said tread edges and having a series of grooves therein which extend completely thereacross and are disposed obliquely with respect to a plane containing the axis of rotation of the tire, the depth of each of the obliquely extending grooves in said central rib varying along its length such that its minimum depth is not more than 50% of its maximum depth, said central rib having a pair of lateral edges and each obliquely extending groove in the central rib is at its maximum depth at the junction of the oblique groove and only one lateral edge of the rib, said maximum depth of each obliquely extending groove in said central rib being at an opposite lateral edge of said central rib from the maximum depth junctions of the circumferentially next adjacent obliquely extending grooves in said central rib, at least one other rib of said set being disposed on each side of said central rib, said other ribs having each having a series of grooves therein which extend completely thereacross and are disposed obliquely with respect to a plane containing the axis of rotation of the tire, the variation in depth along the length of each of the obliquely extending grooves in said other ribs differing from the variation in depth along the length of the circumferentially next adjacent obliquely extending grooves in the same rib, said circumferentially extending grooves having greater maximum depths than the maximum depths of any of the obliquely extending grooves in all of said ribs have widths such that the obliquely extending grooves close up in a footprint of the tire, and the circumferentially extending grooves have widths such that they do not close up in a footprint of the tire, a circumferentially extending array of shoulder blocks being disposed between each lateral edge of the tread and the nearest of said circumferentially extending grooves, the circumferentially next adjacent blocks in said arrays being separated from one another by grooves extending from the respective tread edge to the nearest circumferentially extending groove with a portion of each said separating groove being disposed obliquely with respect to a plane containing the axis of rotation of the tire in a sense that is opposite to the sense at which the grooves extending across the rib nearest to the respective tread edge are oriented.

2. A tire according to claim 1 wherein each of said other ribs has a pair of lateral edges and each obliquely extending groove in each of said other ribs has depths at its junctions with the lateral edges of the respective rib which differ from the depths of the circumferentially next adjacent obliquely extending grooves in the same rib at their junctions with the same lateral edge of the rib.

3. A tire according to claim 1 wherein the lateral edges of each of said other ribs comprise edge segments disposed end to end, some of said edge segments being oriented substantially parallel to the axis of rotation of the tire.

4. A tire according to claim 2 wherein the lateral edges of each of said other ribs comprise edge segments disposed end to end, some of said edge segments being oriented substantially parallel to the axis of rotation of the tire.

5. A tire comprising a read having a pair of lateral edges, a set of at least three ribs extending circumferentially about said tread, each said rib bordered by two grooves which extend circumferentially about the tread, each said circumferentially extending groove having a configuration such that a plane which is perpendicular to the tire's axis of rotation may extend through the groove without intersecting a lateral edge of a rib, the central rib of said set being disposed midway between said tread edges with at least one other rib of said set being disposed on each side of said central rib, each said other rib having a pair of lateral edges comprised of edge segments disposed end to end with some of said edge segments being oriented substantially parallel to the axis of rotation of the tire, each of said ribs having grooves therein which extend completely thereacross and are disposed obliquely with respect to a plane containing the axis of rotation of the tire the depth of each of the obliquely extending grooves in said central rib varying along its length such that its maximum depth is not more than 50% of its maximum depth, said central rib having a pair of lateral edges and each obliquely extending groove in the central rib is at its maximum depth at the junction of the oblique groove and only one lateral edge of the rib, said maximum depth of each obliquely extending groove in said central rib being at an opposite lateral edge of said central rib from the maximum depth junctions of the circumferentially next adjacent obliquely extending grooves in said central rib, in said other ribs every other obliquely extending groove has a substantially constant depth along its entire length and every other obliquely extending groove varies in depth along its length by at least 50% of its maximum depth, said obliquely extending grooves in all of said ribs have widths such that the obliquely extending grooves close up in a footprint of this tire, and the circumferentially extending grooves have width such that they do not close up in a footprint of the tire, a circumferentially extending array of shoulder blocks being disposed between each lateral edge of the tread and the nearest of said circumferentially extending grooves, the circumferentially next adjacent blocks in said arrays being separated one from another by grooves extending from the respective tread edge to the nearest circumferentially extending groove with a portion of each said separating groove being disposed obliquely with respect to a plane containing the axis of rotation of the tire in a sense that is opposite to the sense at which the grooves extending across the rib nearest to the respective tread edge are oriented.

6. A tire according to claim 5 wherein said tread has a net-to-gross ration in the range of 65% to 70%.

7. A tire according to claim 5 wherein said tire is a radial ply tire having a ratio of tread radius to maximum section width in the range of 1.2 to 1.9.

8. A tire according to claim 6 wherein said tire is a radial ply tire having a ratio of tread radius to maximum section width in the range of 1.2 to 1.9.

9. A tire according to any one of claims 5 to 8 wherein for said central rib the ratio of the maximum width of the central rib, as measured parallel to the axis of rotation of the tire, to the maximum depth of the circumferentially extending grooves bordering the central rib, as measured perpendicular to the axis of rotation of the tire, is in the range of 1.3 to 1.8, and for each of said other ribs the ratio of the maximum width of the rib, as measured parallel to the axis of rotation of the tire, to the maximum depth of the circumferentially extending grooves bordering the rib, as measured perpendicular to the axis of rotation of the tire is greater than for said central rib.

10. A tire according to any one of claims 5 to 8 wherein at least a radially outer layer of the tread comprises an elastomeric compound having an elongation at break of at least 575% and a 300% modulus in the range of 6.3 to 8.3 as determined by ASTM standard D412.

11. A tire according to claim 9 wherein at least a radially outer layer of the tread comprises an elastomeric compound having an elongation at break of at least 575% and a 300% modulus in the range of 6.3 to 8.3 as determined by ASTM standard D412.

12. A radial ply pneumatic tire comprising at least one carcass ply of nonmetallic cables and at least one belt ply of steel cables disposed radially outwardly of said carcass ply with said steel cables each having a breaking strength of at least 800 Newtons, and a tread disposed radially outwardly of said belt ply, said tread having a pair of lateral edges and a set of at least three ribs extending circumferentially thereabout, each said rib being bordered by two grooves which extend circumferentially about the tread, each said circumferentially extending groove having a configuration such that a plane which is perpendicular to the tire's axis of rotation could extend through the groove without intersecting a lateral edge of a rib, the central rib of said set being disposed midway between said tread edges and having a series of grooves therein which extend completely thereacross and are disposed obliquely with respect to a plane containing the axis of rotation of the tire, the depth of each of the obliquely extending grooves in said central rib varying along its length such that its minimum depth is not more than 50% of its maximum depth, said central rib having a pair of lateral edges and each obliquely extending groove in its central rib is at its maximum depth at the junction of the oblique groove and only one lateral edge of the rib, said maximum depth of each obliquely extending groove in said central rib being at an opposite lateral edge of said central rib from the maximum depth junctions of the circumferentially next adjacent obliquely extending grooves in said central rib, at least one other rib of said set being disposed on each side of said central rib, said other ribs each having a series of grooves therein which extend completely thereacross and are disposed obliquely with respect to a plane containing the axis of rotation of the tire, the obliquely extending grooves in each of said other ribs alternating circumferentially between grooves which have a substantially constant depth along their lengths and grooves which vary in depth along their lengths such that their minimum depths are not more than 50% of their maximum depths, said circumferentially extending grooves having greater depths than the obliquely extending grooves in said ribs, said obliquely extending grooves in all of said ribs have widths such that the obliquely extending grooves close up in a footprint of the tire, and the circumferentially extending grooves have widths such that they do not close up in a footprint of the tire, and a circumferentially extending array of shoulder blocks being disposed between each lateral edge of the tread and the nearest of said circumferentially extending grooves, the circumferentially next adjacent blocks in said arrays being separated from one another by separating grooves extending from the respective tread edge to the nearest circumferentially extending groove with at least the axially outermost one-half inch of each said separating groove being (a) oriented substantially parallel to the axis of rotation of the tire, (b) having a width of at least 0.06 inch at the radially outermost surface of the tread when the tread is new, and (c) having a depth that is substantially equal to the depth of the two circumferentially extending grooves that border said central rib, and with a portion of each said separating groove being disposed obliquely with respect to a plane containing the axis of rotation of the tire in a sense that is opposite to the sense at which the groove extending across the rib nearest to the respective tread edge are oriented.

13. A radial ply pneumatic tire according to claim 12 wherein each of said other ribs has a pair of lateral edges and some of the edge segments of each of said other ribs are oriented substantially parallel to the axis of rotation of the tire.

14. A radial ply pneumatic tire according to either of claims 12 or 13 wherein wherein said tread has a net-to-gross ratio in the range of 65% to 75%.

15. A radial ply pneumatic tire according to either of claims 12 or 13 wherein for said central rib the ratio of the maximum width of the rib, as measured parallel to the axis of rotation of the tire, to the maximum depth of the circumferentially extending grooves bordering the rib, as measured perpendicular to the axis of rotation of the tire, is in the range of 1.3 to 1.8, and for each of said other ribs the ratio of the maximum width of the rib, as measured parallel to the axis of rotation of the tire, to the maximum depth of the circumferentially extending grooves bordering the rib, as measured perpendicular to the axis of rotation of the tire, is greater than for said central rib.

16. A radial ply pneumatic tire according to either of claims 12 or 13 wherein at least a radially outer layer of the tread comprises an elastomeric compound having an elongation at break of at least 575% in the and a 300% modulus in the range of 6.3 to 8.3 as determined by ASTM standard D412.

17. A radial ply pneumatic tire according to claim 15 wherein said tire has a net to gross ratio in the range of 65% to 70%, at least a radially outer layer of the tread comprising an elastomeric compound having an elongation at break of at least 575% and a 300% modulus in the range of 6.3 to 8.3 as determined by ASTM standard D412.

* * * * *